Nov. 2, 1943.      H. C. HOPKINS      2,333,376
READING RACK
Filed Dec. 11, 1941      2 Sheets-Sheet 1
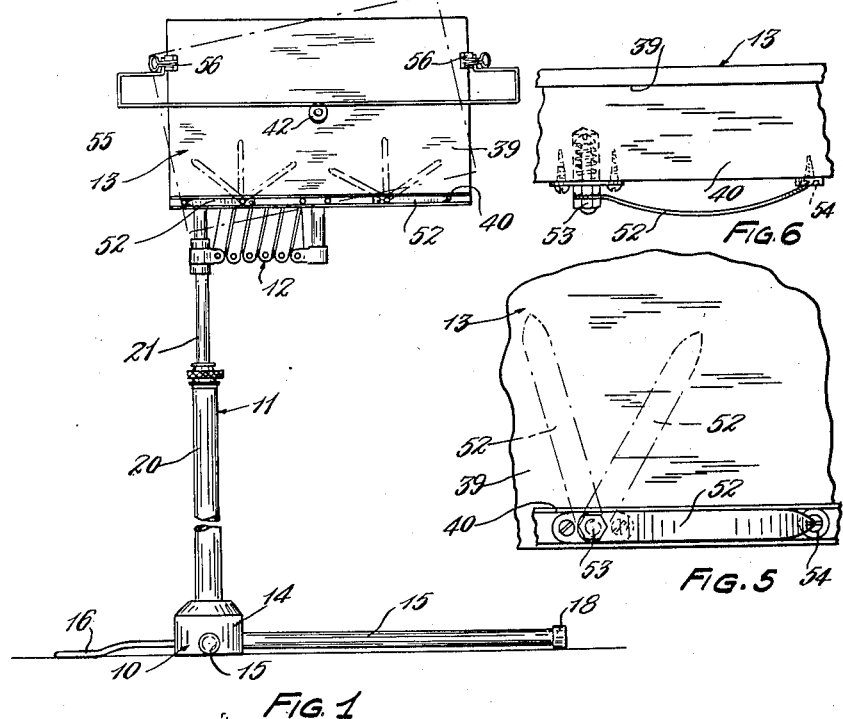
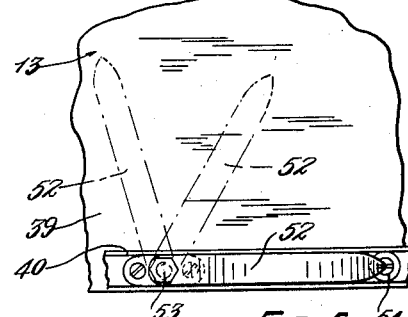
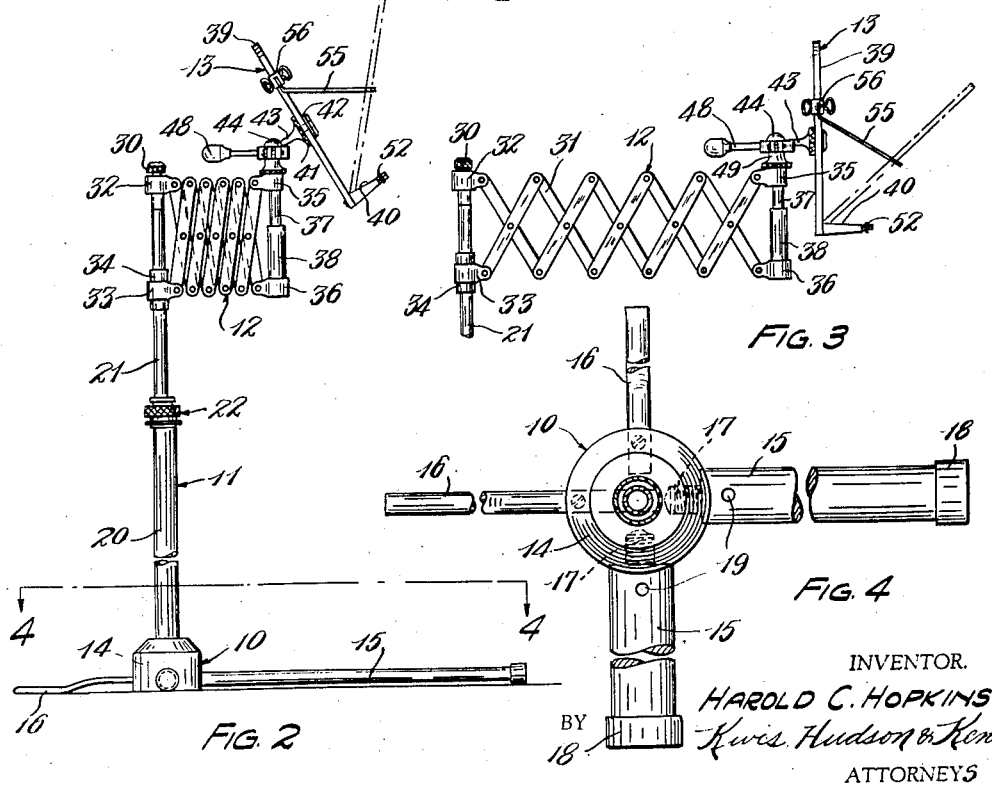
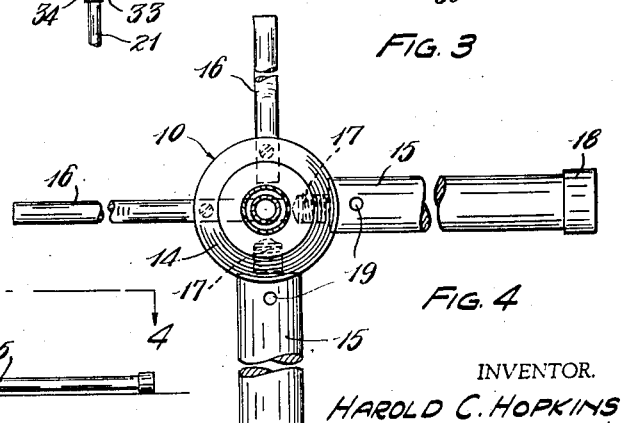
INVENTOR.
HAROLD C. HOPKINS
BY Kwis, Hudson & Kent
ATTORNEYS

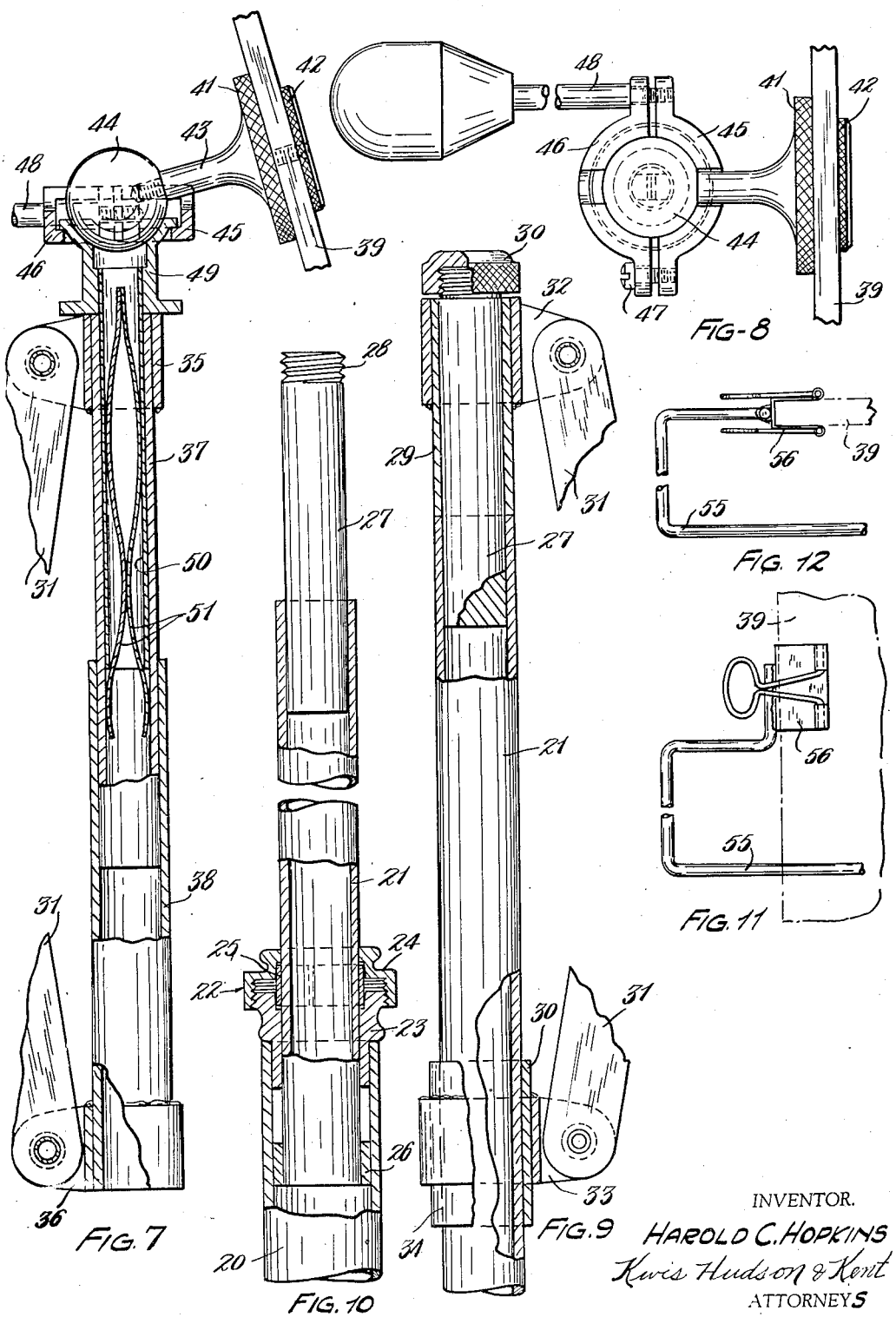

/ Patented Nov. 2, 1943

2,333,376

UNITED STATES PATENT OFFICE 2,333,376

READING RACK

Harold C. Hopkins, Cleveland Heights, Ohio

Application December 11, 1941, Serial No. 422,488

6 Claims. (Cl. 45—60)

This invention relates to a reading rack and has for its main object to provide a rack which in general is more satisfactory and efficient than those which have been used or proposed heretofore.

More particularly it is the aim of the invention to provide a rack which is so constructed and provided with numerous adjustments so arranged that the reading matter or work can be brought up to the desired position before the eyes of the user of the rack, whether seated in a bed or chair or whether in a wholly or partially reclined position, with the least possible eyestrain and physical discomfort.

The invention may be briefly summarized as consisting in certain novel details of construction and combinations and arrangements of parts which will be described in the specification and set forth in the appended claims.

In the accompanying sheets of drawings wherein I have shown an embodiment of the invention which operates very effectively, Fig. 1 is a front view of the rack;

Fig. 2 is a side view;

Fig. 3 is a view similar to Fig. 2 with the extensible supporting arm of the support for the reading matter extended with reference to the position shown in Fig. 2;

Fig. 4 is a sectional plan view on an enlarged scale substantially along the horizontal line 4—4 of Fig. 2;

Figs. 5 and 6 are, respectively, a detail front view and a detail plan view showing particularly one of the adjustable fingers which are mounted on the ledge of the book support and are swingable to and from a position to engage a leaf or page of the book;

Fig. 7 is an enlarged view partly in vertical section and partly in elevation showing particularly the outer member of the extensible arm and the universal connection between it and the book support;

Fig. 8 is a top plan view of the same;

Figs. 9 and 10 are enlarged views partly in vertical section and partly in elevation showing details of the vertically adjustable column; and Figs. 11 and 12 are, respectively, an elevational view and a plan view showing a portion of a book engaging member adapted to be clamped to the side edges of the book support and to extend across the front of the same to help support the book or reading matter for use when the reader is in a reclined position.

My improved reading rack is of course adaptable for supporting a book, magazine, or other reading matter, but for the sake of brevity the reading matter will be referred to herein as a book and the member which directly supports it as the book support.

My improved reading rack consists of four main parts, to-wit, a base 10, an adjustable vertical column 11, an extensible horizontal arm 12, and a tiltable book support 13. My invention consists in numerous details of construction of these main parts of the rack and of novelly arranged and functioning parts applied thereto.

The base 10 comprises a cylindrical block or body 14 to which are secured two relatively long supporting feet 15 and two relatively short supporting feet 16, the former being adapted to be extended under the bed or chair occupied by the reader and the latter feet being so formed that their obstructing effect will be reduced to a minimum and will not cause serious discomfort if trod upon by a person in bare or stocking feet. These supporting feet are arranged 90° apart, the two relatively long feet 15 as well as the two relatively short feet 16 being at right angles to each other.

The two relatively long feet 15 are preferably in the form of straight solid rods which at their inner ends are suitably attached to the lower part of the block 14. The inner ends of the rods preferably have reduced threaded extensions shown by dotted lines at 17 which are screwed into threaded openings near the bottom of the block 14. Counterbored openings are provided in the block concentric with the tapped openings so that the full diameter of the feet will fit slightly into these counterbored openings and make a neat joint where they engage the block. These rods are preferably straight and at their outer ends they are preferably provided with slight enlargements in the form of caps 18 which are preferably sweated onto the outer ends of the rods and constitute the floor engaging members of these rods. To facilitate the removal and application of the feet 15, they may be provided with openings 19 to receive a pin which will serve as a wrench to turn them so that the surfaces of the feet 15 will not be marred as would be the case if a jaw-type wrench were required.

The feet 16 are not only shorter than the feet 15 but are formed of rods of considerably smaller diameter than the rods forming the feet 15. The inner ends of these rods or feet 16 extend into openings formed in the lower part of the block 14 in line with the openings which receive the longer feet 15 and they extend outwardly a short distance from the block and then are bent downwardly so that at and adjacent their outer ends they will rest on the floor. These shorter feet 16 are preferably secured in the block 14 by setscrews fitted into threaded openings formed in the lower side of the block.

The vertical column 11 consists of two telescopic tubes 20 and 21 which may be moved relatively to each other to adjust the height of the book support 13. The lower tube 20 is secured at its lower end to the block 14 preferably by having a pressed fit in a cylindrical opening bored vertically through the block. The upper tube 21 is smaller in diameter than the tube 20 and slides in the latter. The two tubes are adapted to be secured together after they have been adjusted as to height by a manually adjustable clamp 22 including a lower bushing 23 provided at the bottom with a sleeve-like extension secured in the upper end of the tube 20, as by means of a forced fit, and having an upper enlarged part which is threaded externally, and the clamp includes also a nut 24 through which the tube 21 loosely extends and having a skirt portion threaded internally and engaging the threaded part of the bushing 23. The bushing and the nut have a cavity formed therein with tapered walls, and in this cavity surrounding the upper tube 21 is a split spring sleeve 25 which, when the nut 24 is screwed down, is caused to tightly clamp the tube 21 so as to secure it to the lower tube 20, and when the nut 24 is screwed up, it releases the tube 21 so that it can be slid up or down in the lower tube 20. To prevent the tube 21 from being entirely pulled out of the lower tube 20, the lower end of the tube 21 has secured to it, as by sweating, a collar 26 which is adapted to engage the lower end of the bushing 23 of the clamp 22. To prevent the tube 21 from engaging the floor when the tube is lowered, the inner end of one of the shorter feet 16 is extended across the bore in the block 14 in which the lower tube 20 is secured so as to act as a stop. This is indicated by dotted lines in Fig. 4.

Secured as by a drive fit in the upper end of tube 21 in line with its axis is a cylindrical pin 27 having a threaded upper end 28. Mounted on this pin 27 and freely rotatable thereon is a sleeve 29. This sleeve which is of the same diameter as tube 21 at its lower end bears against the upper end of tube 21. It is held from movement endwise of the pin by the upper end of tube 21 and by a nut 30 which is screwed onto the threaded end 28 of pin 27.

The extensible arm 12 consists of a series of lazy tong straps 31 which are connected together at their ends and at points midway between their ends in the manner common with lazy tong constructions. The connections between the straps 31 are preferably made by hollow rivets. The two straps which are at the inner end of the arm next to the column 11 have their ends pivotally secured respectively to an upper fitting 32 and a lower fitting 33. Fitting 32 is secured as by sweating to the sleeve 29, as stated above, is rotatably mounted on pin 27. The lower fitting 33 is pivotally secured as by sweating to a sleeve 34 which is capable of turning on tube 21 and of moving up or down when the arm 12 is extended or contracted.

The two straps 31 at the outer end of the arm 12 have their ends pivotally secured respectively to an upper fitting 35 and to a lower fitting 36. These fittings 35 and 36 are secured respectively, as by sweating, to an upper tube 37 and to a lower tube 38 which are telescopically arranged, the upper tube 37 extending into the lower tube 38. The tube 38 slides up and down on tube 37 (coincidental with the sliding movements of sleeve 34 on tube 21) as the arm 12 is extended and contracted.

It might be noted at this point that when the nut 30 at the upper end of pin 27 is removed the extensible arm 12 can be removed from or applied to the column.

The book support 13 consists of a flat rectangularly shaped panel 39 and a ledge 40 secured along its lower edge. While the ledge 40 is in general at right angles to the panel 39 its top surface is tapered as shown in Figs. 2 and 3 so that when the panel is in inclined position and the book is resting against it the leaves, when turned, will not scrape against the top surface of the ledge. The book support is in turn supported for swinging movement in all directions by the upper ends of the tube 37 and the fitting 35 which is secured to it. A ball and socket or universal connection is preferably utilized in the supporting means for the book support. It will be observed by reference to Figs. 1, 2, 3, 7, and 8 that this supporting means for the book support is attached to the center of the panel 39. The attaching means consists of two disks 41 and 42, the disk 41 having a threaded stud extending forwardly through the panel and the disk 42 being in the form of a nut which is screwed onto the stud so that when the nut is tightened the panel is securely clamped between the disks.

The inner or rear disk 41 is integral with a stem 43 in turn either formed integral with or attached to a ball 44 of the ball and socket connection. The ball 44 is mounted for universal swinging movement in a seat or cage consisting in this instance of three parts having ball engaging spherically curved portions. The upper part of the cage or seat consists of two clamping members 45 and 46 having at their ends pairs of ears one pair being connected together by a screw 47. The ears comprising the other pair are engaged by a threaded member forming a part of a manually adjustable clamping rod 48 which when turned adjusts the ears toward or away from each other so as to vary the pressure of the clamping members 45 and 46 on the ball so that it is possible for the ball to turn readily in the seat or cage or to be tightly clamped so as to be held from universal movement therein. The lower part of the seat or cage for the ball 44 consists of a sleeve-like member 49 flanged outwardly at its upper end to form a ball engaging portion and flanged at its lower end to form a seat on the upper end of the tube 37 and fitting 35, as clearly shown in Fig. 7.

Secured in the bore of the member 49, as by a drive fit, is a tube 50 which is fitted into and loosely or slidingly engages in the upper tube 37. This tube 50 carries a pair of springs 51 which at their lower ends extend down below the tube 50 and frictionally engage the inner wall of the tube 37, so as to frictionally retard to the desired extent the turning movement of the inner tube 50 in the outer tube 37.

With this construction the book support, including the universal connection, may be turned or swung as a unit about the axis of the outer end of the extensible arm 12 formed by the telescopic tubes 37 and 38. It will be seen that the inner tube 50 attached to the member 49 constitutes the means for detachably supporting the book support at the outer end of the extensible arm, that is to say, to apply the book support to the arm it is only necessary to insert the tube 50 in the tube 37 until the flanged lower end of the sleeve-like ball and socket member 49 engages the upper ends of the tube 37 and the fitting 35, and of course to remove the book support it is only necessary to lift it so that the inner tube 50 attached to the book support slides out of the tube 37 attached to and forming a part of the extensible arm.

The ledge 40 of the book support is preferably provided with a pair of page-holders 52 consisting of spring fingers secured by fasteners 53 to the front edge of the ledge 40. They can be swung to or from page-holding position, as indicated by full and dotted lines in Figs. 1 and 5, and when they are not in use they extend alongside the front edge of the ledge, at which time their free ends fit into recessed retainers 54.

The book support has an attachment which will enable the reading matter to be supported so that it can be read by a person in a fully or partially reclined position. As will be seen by reference to Figs. 2 and 3, this attachment consists of an auxiliary book support in the form of a wire 55 having its ends secured to spring clamps 56 which can be clamped to the edge portions of the panel 39 and can be slid up and down along the same. The main or front portion of the wire 55 is adapted to extend across the front of the panel from one clamp 56 to the other so as to partially support the book or other reading matter so as to hold it in a plane tipped forwardly from the vertical, as indicated in Figs. 2 and 3. The end portions of the wire 55 may extend beyond the ends of the panel, as indicated in the drawings, so as to accommodate reading matter which is wider than the length of the panel. This auxiliary book support 55 will ordinarily not be employed, especially if the reader is sitting up in a bed or chair, but can be readily applied to permit reading when the reader desires to read in a fully or partly reclining position, as stated above.

Ordinarily, when the rack is not in use the extensible arm will be collapsed, as in Fig. 2, and swung to one side of the bed or chair, and when the person is ready to read, he will swing the book support and at the same time extend the arm 12 so as to position the book support in front of him. To bring it directly or accurately in front of him, he may turn the book support on the outer end of the extensible arm, thus providing a finer positioning than could generally be obtained if he had to rely upon the swinging of the extensible arm about the axis of the column 11. The book support can then be readily tilted so that the plane of the reading matter will be generally at right angles to the line of vision, this being done, of course, by reason of the ball and socket joint at the rear of the book support between the latter and the outer end of the extensible arm.

If the reader intends to read when seated squarely in front of the book support, the latter will be positioned as shown by full lines in Fig. 1. On the other hand, if he desires to read with the upper part of his body tilted somewhat, as, for example, with his arm resting on the arm of a chair, the support can be tilted by reason of the ball and socket connection to a position substantially as shown by dotted lines in Fig. 1 so that the imaginary line extending across the eyes of the reader will be parallel to the lines of the reading matter.

Thus it will be seen that I have provided a reading rack which will enable reading to be accomplished with the least physical inconvenience and with the minimum of eyestrain to the reader regardless of the position in which he desires or is required to be while the reading is being done. Thus this rack is not only a very useful article but is also so formed as to be neat and attractive in appearance so that it may be used in any part of the home.

While I have shown the preferred construction, I do not desire to be confined to the precise details illustrated, but aim in my claims to cover all modifications which do not involve a departure from the spirit and the scope of the invention.

Having thus described my invention, I claim:

1. In a reading rack of the type which is adapted to be supported at the outer end of an extensible arm, a book support comprising a panel and a ledge at the bottom thereof, an auxiliary book support in the form of a wire or rod adapted to extend across the front of the book or other material supported by the book support so as to permit the reading matter to be read by the patient when in a fully or partly reclining position, and a pair of clamps carrying said wire or rod and slidably engaging the opposite upright edges of the panel.

2. In a reading rack of the type which is adapted to be supported at the outer end of an extensible arm, a book support comprising a panel and a ledge at the bottom thereof, and an auxiliary book support in the form of a wire or rod adapted to extend across the front of the book or other material supported by the book support so as to permit the reading matter to be read by the patient when in a fully or partly reclining position, and means clamping said rod or wire to the upright side edges of the panel.

3. A reading rack comprising a standard, a pair of sleeves on the standard one of which is slidable thereon, an extensible arm of the lazy tong type composed of links pivoted to one another, the inner end of the arm having adjoining links pivoted respectively to said sleeves, a pair of interengaging members one slidable vertically relative to the other at the outer end of the arm, adjoining links at said outer end being pivoted respectively to said two members, a holder for a book or other reading matter, and a supporting connection for said holder telescopically fitted to the upper of said members.

4. A reading rack comprising a standard, a pair of sleeves on the standard one slidable thereon, an extensible arm of the lazy tong type composed of pivoted links, the inner end of the arm having adjoining links pivotally connected to said sleeves, a second pair of interengaging sleeves arranged at the outer end of the arm and one slidable vertically relative to the other, adjoining links at said outer end being pivoted respectively to said sleeves, a support for a book or other reading matter, a cylindrical member insertable in the upper of said second mentioned sleeves, and connecting means between said support and the upper end of said cylindrical member.

5. A reading rack comprising a standard, a pair of sleeves on the standard one slidable thereon, an extensible arm of the lazy tong type composed of pivoted links, the inner end of the arm having adjoining links pivotally connected to said sleeves, a second pair of interengaging sleeves arranged at the outer end of the arm and one slidable vertically relative to the other, adjoining links at said outer end being pivoted respectively to said second mentioned sleeves, a support for a book or other reading matter, a cylindrical member insertable in the upper of said second mentioned sleeves, and a ball and socket connection between said support and the upper end of said cylindrical member.

6. In combination with an extensible arm, a pair of sleeves slidably engaging each other and pivotally connected to the outer end of the arm, a reading rack comprising a panel adapted to support reading matter, a tubular member insertable in the upper of said sleeves, a connection between said tubular member and the panel, said tubular member having one or more spring-like members attached thereto and extending below the same and adapted at their lower ends to engage the inner wall of said upper sleeve to provide resistance to rotation.

HAROLD C. HOPKINS.